United States Patent
Nagai

(10) Patent No.: US 9,633,290 B2
(45) Date of Patent: Apr. 25, 2017

(54) IMAGE PROCESSING APPARATUS AND CONTROL METHOD THEREFOR

(71) Applicant: CANON KABUSHIKI KAISHA, Tokyo (JP)

(72) Inventor: Jun Nagai, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/710,839

(22) Filed: May 13, 2015

(65) Prior Publication Data

US 2015/0339556 A1   Nov. 26, 2015

(30) Foreign Application Priority Data

May 21, 2014  (JP) ................................. 2014-105661

(51) Int. Cl.

| | | |
|---|---|---|
| H04N 1/405 | (2006.01) | |
| H04N 1/60 | (2006.01) | |
| G06K 15/00 | (2006.01) | |
| G06K 15/02 | (2006.01) | |
| G06T 7/40 | (2017.01) | |
| G06T 7/00 | (2017.01) | |
| G03G 21/00 | (2006.01) | |

(Continued)

(52) U.S. Cl.
CPC ..... *G06K 15/1881* (2013.01); *G03G 15/0115* (2013.01); *G03G 21/00* (2013.01); *G06T 7/0048* (2013.01); *G06T 7/408* (2013.01); *H04N 1/40* (2013.01); *G06T 2207/10024* (2013.01); *G06T 2207/20021* (2013.01); *G06T 2207/20076* (2013.01); *G06T 2207/20144* (2013.01)

(58) Field of Classification Search
None
See application file for complete search history.

(56) References Cited

U.S. PATENT DOCUMENTS 4,930,021 A * 5/1990 Okada .................. H04N 1/3935
358/445
5,296,935 A * 3/1994 Bresler .................... G06F 17/15
358/406

(Continued)

FOREIGN PATENT DOCUMENTS

| JP | 2005234391 A | 9/2005 |
|---|---|---|
| JP | 2009200860 A | 9/2009 |
| JP | 2009290612 A | 12/2009 |

OTHER PUBLICATIONS

Office Action issued in Japanese Appln. No. 2014-105661 mailed Apr. 22, 2016.

*Primary Examiner* — Madelein Nguyen
(74) *Attorney, Agent, or Firm* — Rossi, Kimms & McDowell LLP

(57) ABSTRACT

Whether a pixel in an image is included in a region with at least a predetermined number of lines is determined; with regard to a pixel that is determined to be included in the region with at least the predetermined number of lines, a pixel value is reduced at the same reduction rate whether the pixel is an edge portion or a non-edge portion, and with regard to a pixel that is determined to be included in a region in which the number of lines is smaller than the predetermined number, a pixel value is reduced in such a manner that a reduction rate is higher when the pixel is the non-edge portion than when the pixel is the edge portion.

18 Claims, 7 Drawing Sheets

(51) Int. Cl.
*H04N 1/40* (2006.01)
*G03G 15/01* (2006.01)

(56) References Cited

U.S. PATENT DOCUMENTS

| | | | | |
|---|---|---|---|---|
| 5,422,964 A * | 6/1995 | Devimeux | ............. | H04N 19/86 358/461 |
| 5,428,461 A * | 6/1995 | Yamashita | ......... | H04N 1/40068 358/3.07 |
| 5,487,172 A * | 1/1996 | Hyatt | .................. | B60R 16/0373 700/8 |
| 5,566,252 A * | 10/1996 | Miyaza | .................. | G03G 15/50 382/177 |
| 5,646,741 A * | 7/1997 | Horiuchi | ............... | G06T 3/4023 358/3.07 |
| 5,821,957 A * | 10/1998 | Berge | ................... | G06K 15/107 347/40 |
| 5,920,356 A * | 7/1999 | Gupta | ....................... | G06T 5/20 348/606 |
| 6,104,841 A * | 8/2000 | Tojo | ...................... | G06T 3/0006 348/112 |
| 8,243,330 B2 | 8/2012 | Miyagi | | |
| 8,610,931 B2 * | 12/2013 | Nakata | .................. | G06F 3/1205 358/1.15 |
| 2002/0031263 A1 * | 3/2002 | Yamakawa | ............ | H04N 1/409 382/199 |
| 2003/0035673 A1 * | 2/2003 | Yamakawa | ........ | H04N 1/40062 400/76 |
| 2003/0048476 A1 * | 3/2003 | Yamakawa | .......... | H04N 1/6072 358/3.1 |
| 2003/0095272 A1 * | 5/2003 | Nomizu | ............. | H04N 1/32561 358/1.9 |
| 2004/0001230 A1 * | 1/2004 | Kagawa | .................. | H04N 1/56 358/2.1 |
| 2004/0234135 A1 * | 11/2004 | Nomizu | ............. | G06K 9/00456 382/209 |
| 2004/0265709 A1 * | 12/2004 | Kanamitsu | ................ | G03F 1/32 430/5 |
| 2005/0018903 A1 * | 1/2005 | Miyagi | ................ | H04N 1/4092 382/167 |
| 2005/0052671 A1 * | 3/2005 | Nishikawa | ........... | H04N 1/6058 358/1.9 |
| 2005/0068553 A1 * | 3/2005 | Otake | .................... | H04N 1/628 359/1.9 |
| 2005/0135699 A1 * | 6/2005 | Anderson | ............... | G06T 5/002 382/261 |
| 2005/0135700 A1 * | 6/2005 | Anderson | ............... | G06T 5/002 382/261 |
| 2006/0044574 A1 * | 3/2006 | Ide | ....................... | G06K 15/107 358/1.8 |
| 2008/0085061 A1 * | 4/2008 | Arici | ........................ | G06T 5/20 382/268 |
| 2008/0187336 A1 * | 8/2008 | Itagaki | ............... | G03G 15/5042 399/52 |
| 2009/0110419 A1 * | 4/2009 | Suzuki | ................. | G03G 15/043 399/45 |
| 2009/0190193 A1 * | 7/2009 | Sato | ....................... | H04N 1/486 358/505 |
| 2011/0148959 A1 * | 6/2011 | Kato | ...................... | B41J 2/2132 347/9 |
| 2011/0176728 A1 * | 7/2011 | Matsuoka | ................ | H04N 1/41 382/166 |
| 2012/0250101 A1 * | 10/2012 | Kuraya | ............. | H04N 1/40068 358/448 |
| 2012/0250102 A1 * | 10/2012 | Kuraya | ............. | H04N 1/33315 358/448 |
| 2012/0301026 A1 * | 11/2012 | Fukunaga | ............ | H04N 1/6086 382/167 |
| 2013/0235392 A1 * | 9/2013 | Iinuma | ................. | G06K 15/005 358/1.2 |
| 2013/0300791 A1 * | 11/2013 | Yazawa | .................... | H04N 1/54 347/15 |
| 2014/0340554 A1 * | 11/2014 | Ishii | ....................... | H04N 5/343 348/302 |

* cited by examiner

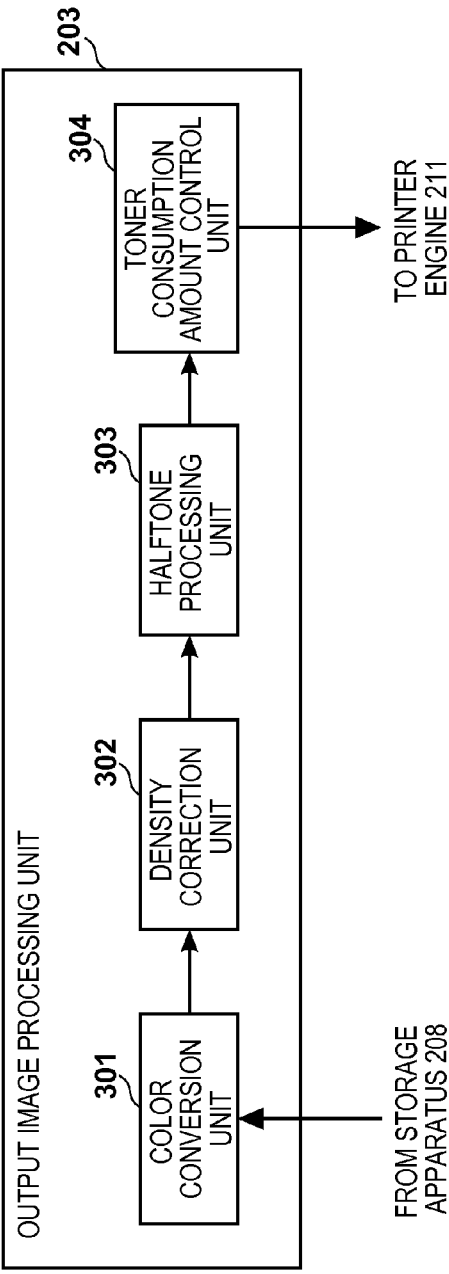
F I G. 3
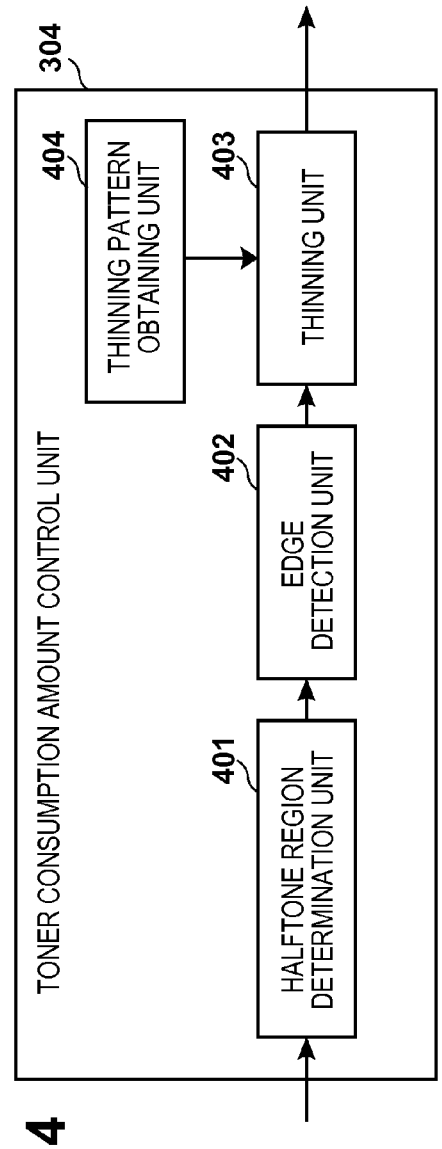
F I G. 4

REFERENCE WINDOW
(11 × 11 PIXELS)

HALFTONE PATTERN
(600 dpi/106 LINES)

THIN OUT 0 AND 3

THIN OUT 1 AND 3

IMAGE PROCESSING APPARATUS AND CONTROL METHOD THEREFOR

BACKGROUND OF THE INVENTION

Field of the Invention

The present invention relates to an image processing apparatus and control method therefor.

Description of the Related Art

There is an increasing frequency of printing of data generated by a personal computer and the like using an image processing apparatus with a printing function. At the time of printing, the image processing apparatus forms an image using a recording agent, such as toner and ink, in accordance with an inkjet recording method, an electrophotographic method, or other image forming methods. The amount of consumption of the recording agent, such as toner and ink, greatly influences a running cost; in view of this, there are known image processing apparatuses that have a recording agent saving mode called an ink saving mode, a toner saving mode, and the like for the purpose of reducing the amount of consumption of the recording agent.

There are common methods for achieving such a reduction in the amount of consumption of the recording agent, one example being a method for reducing the amount of consumption of the recording agent by executing dot thinning processing through application of hatching processing to the entirety of image data when a recording agent saving mode has been selected. There is also a method for reducing the amount of consumption of the recording agent by executing density conversion processing at the time of printing in such a manner that, when a recording agent saving mode is selected, density conversion processing that is different from the one used in a normal printing mode is executed so as to lower the output density.

However, in the recording agent saving modes according to the foregoing conventional methods, the amount of consumption of the recording agent is reduced for the entirety of image data, and therefore the density of a whole image becomes lower than that of an image printed in a normal printing mode, which results in a decreased printing quality. Especially, in a character portion of image data, the decreased printing quality could possibly make it difficult to read characters. Accordingly, there is a need for a method for further suppressing a decrease in the printing quality, especially in a character portion of image data, while reducing the amount of consumption of the recording agent.

In view of this, an image forming apparatus of Japanese Patent Laid-Open No. 2005-234391 (hereinafter Document 1) executes region determination processing for determining whether a region is a character region or a photograph region based on feature data included in image data, and in a recording agent saving mode, decides on a deletion rate at which pixels to be recorded are deleted for each of the character region and the photograph region. At this time, an edge portion of a character image is enhanced by making the deletion rate for an edge portion lower than the deletion rate for a non-edge portion of the character region. On the other hand, a uniform deletion rate is set for an edge portion and a non-edge portion of the photograph region, because enhancing the edge portion of the photograph region triggers deterioration in the image quality, such as tone reversal. In this way, Document 1 achieves a recording agent saving mode that suppresses a decrease in the printing quality of a character image while suppressing edge enhancement processing from unfavorably influencing a photographic image.

In Document 1 described above, by making a determination of a character region or a photograph region and switching to recording agent reduction processing (a deletion rate of pixels to be recorded) corresponding to the character region or the photograph region, a decrease in the legibility of characters is suppressed when a recording agent saving mode has been set. As described above, the image processing apparatus disclosed in Document 1 makes a determination of the character region or the photograph region based on the result of analysis on an image feature amount. However, in reality, it is difficult to determine regions of a character image and a photographic image with high precision in an image where the character image and the photographic image coexist. Especially, determining an image region at low cost leads to a high possibility of an erroneous determination of the image region, and such an erroneous determination triggers deterioration in the image quality, such as a decrease in the legibility of a character image, and tone reversal in a photographic image.

SUMMARY OF THE INVENTION

An embodiment of the present invention discloses an image processing apparatus and method that not only reduce the amount of consumption of a recording agent, but also maintain a required image quality, at low cost.

According to one aspect of the present invention, there is provided an image processing apparatus, comprising: a determination unit configured to determine whether a pixel in an image is included in a region with at least a predetermined number of lines; and a reduction unit configured to, with regard to a pixel that is determined by the determination unit to be included in the region with at least the predetermined number of lines, reduce a pixel value at the same reduction rate whether the pixel is an edge portion or a non-edge portion, and with regard to a pixel that is determined by the determination unit to be included in a region in which the number of lines is smaller than the predetermined number, reduce a pixel value in such a manner that a reduction rate is higher when the pixel is the non-edge portion than when the pixel is the edge portion.

According to another aspect of the present invention, there is provided an image processing apparatus, comprising: a determination unit configured to determine whether a pixel in a binary image is included in a region with at least a predetermined number of lines, the binary image including white and black pixels; and a correction unit configured: to correct a part of black pixels that have been determined by the determination unit to be included in the region with at least the predetermined number of lines to white pixels; to correct a part of black pixels that have been determined by the determination unit to be included in a region in which the number of lines is smaller than the predetermined number and that are non-edge portions to white pixels; and not to correct black pixels that have been determined by the determination unit to be included in the region in which the number of lines is smaller than the predetermined number and that are edge portions to white pixels.

According to another aspect of the present invention, there is provided an image processing method, comprising: a determination step of determining whether a pixel in an image is included in a region with at least a predetermined number of lines; and a reduction step of, with regard to a pixel that is determined in the determination step to be included in the region with at least the predetermined number of lines, reducing a pixel value at the same reduction rate whether the pixel is an edge portion or a non-edge portion, and with regard to a pixel that is determined in the determination step to be included in a region in which the number of lines is smaller than the predetermined number, reducing a pixel value in such a manner that a reduction rate is higher when the pixel is the non-edge portion than when the pixel is the edge portion.

According to another aspect of the present invention, there is provided an image processing method, comprising: a determination step of determining whether a pixel in a binary image is included in a region with at least a predetermined number of lines, the binary image including white and black pixels; and a correction step of: correcting a part of black pixels that have been determined in the determination step to be included in the region with at least the predetermined number of lines to white pixels; correcting a part of black pixels that have been determined in the determination step to be included in a region in which the number of lines is smaller than the predetermined number and that are non-edge portions to white pixels; and not correcting black pixels that have been determined in the determination step to be included in the region in which the number of lines is smaller than the predetermined number and that are edge portions to white pixels.

Further features of the present invention will become apparent from the following description of exemplary embodiments with reference to the attached drawings.

BRIEF DESCRIPTION OF THE DRAWINGS

FIG. 3 is a block diagram showing an example of a functional configuration of an output image processing unit according to the embodiment.

FIG. 4 is a block diagram showing an example of a functional configuration of a toner consumption amount control unit according to the embodiment.

FIG. 9 shows a reference window used by a halftone region determination unit according to a second embodiment.

DESCRIPTION OF THE EMBODIMENTS

The following describes some of preferred embodiments of the present invention with reference to the attached drawings. Although the following description of embodiments pertains to a case in which the present invention is applied to an image forming apparatus represented by a multi-function peripheral (multi-function printer, hereinafter MFP) that uses toner as a recording agent, the present invention is not limited in this way. Various modifications are possible without departing from the concept of the present invention; for example, an image forming apparatus of an inkjet recording type using ink, a single-function image forming apparatus of an electrophotographic type using toner, and the like can be used.

First Embodiment

Figure 1:
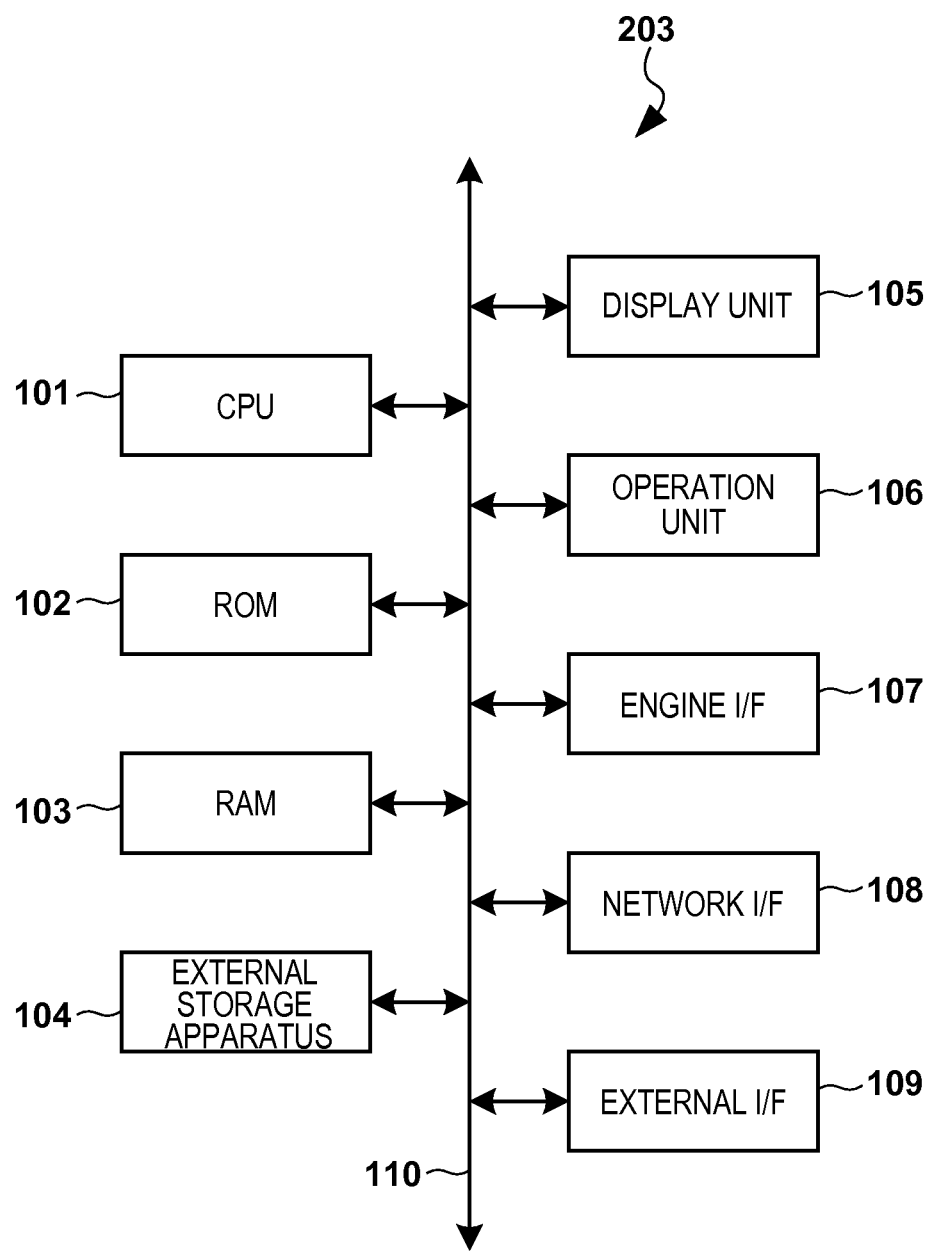
FIG. 1 is a block diagram showing an example of a hardware configuration of an image processing apparatus according to an embodiment.

FIG. 1 is a block diagram showing a basic configuration of an image processing apparatus 203 (see FIG. 2) according to a first embodiment. The image processing apparatus 203 is responsible for various types of control for an image forming apparatus 200. The image processing apparatus 203 includes a CPU 101, a ROM 102, a RAM 103, an external storage apparatus 104, a display unit 105, an operation unit 106, an engine interface 107, a network interface 108, an external interface 109, and a system bus 110.

To further expound the foregoing configuration, the CPU 101 is a central processing unit for controlling the entire apparatus, executing calculation processing, and the like, and executes various types of processing, which will be described later, based on programs stored in the ROM 102. The ROM 102 is a read-only memory. The ROM 102 is an area for storing data, such as a system boot program, a program for controlling a printer engine 211, and information of character data and character codes. The RAM 103 is a random-access memory. The RAM 103 stores font data that has been additionally registered by way of downloading, and programs and data are loaded thereinto per processing of various types. Furthermore, various types of programs are deployed to the RAM 103, and the CPU 101 executes the deployed programs. The RAM 103 can also be used as a data storage area for received image data. The external storage apparatus 104 is constituted by, for example, a hard disk. The external storage apparatus 104 is used to spool data, to store programs, information files, and image data, and as a working area for the CPU 101.

The display unit 105 includes, for example, a liquid crystal display device, and performs various types of display under control by the CPU 101. The display unit 105 is used to display, for example, the statuses of settings of the image forming apparatus 200, current processing inside the apparatus, and the statuses of errors. The operation unit 106 is used by a user to instruct the image forming apparatus 200 of changes in the settings and resetting. Together with the display unit 105, the operation unit 106 provides a user interface. For example, the operation unit 106 can cause the display unit 105 to display an operation screen for accepting designation of printing conditions, such as setting of a recording agent saving mode for conducting printing with a reduced amount of toner consumption.

Figure 2:
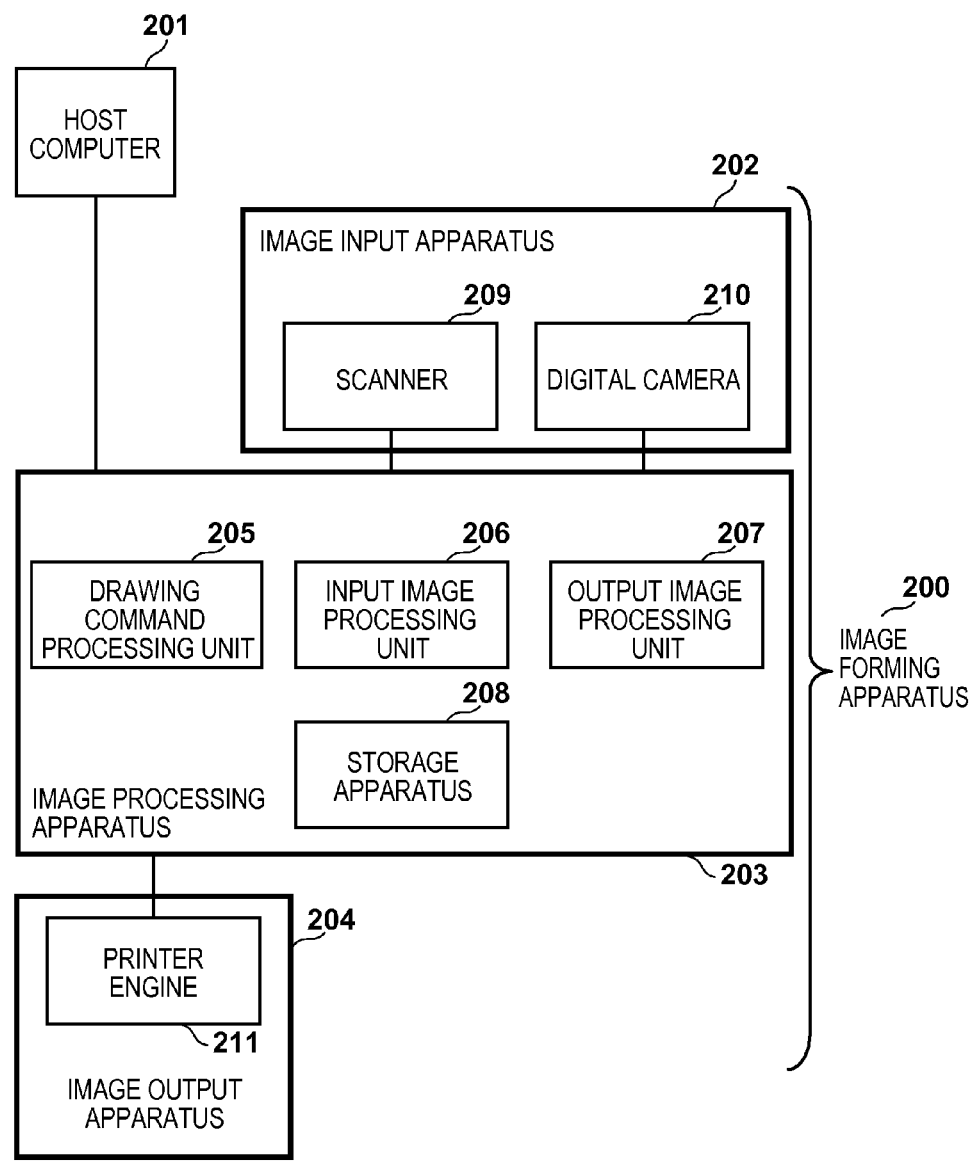
FIG. 2 is a block diagram showing an example of a configuration of a multi-function peripheral (hereinafter MFP) according to the embodiment.

The engine interface 107 is an interface for inputting/outputting, for example, a command for controlling the printer engine 211 (FIG. 2). The network interface 108 is an interface for connecting the image processing apparatus 203 to a network. For example, the image processing apparatus 203 receives image data and a drawing command from a host computer 201 via the network and the network interface 108. The external interface 109 is connected to a scanner 209 and a digital camera 210, which are image input apparatuses, via a parallel or serial interface and the like. The system bus 110 functions as a data channel between the foregoing constituent elements.

FIG. 2 is a block diagram showing a configuration of the image forming apparatus 200 according to the first embodiment. The image forming apparatus 200 is a multi-function peripheral (MFP) including an image input apparatus 202, the image processing apparatus 203, and an image output apparatus 204. For example, the functional units of the image processing apparatus 203 may be realized by the CPU 101 executing predetermined programs stored in the ROM 102, or a part or all thereof may be realized by a dedicated IC. With reference to FIG. 2, the following describes processing for receiving a drawing command transmitted from the host computer 201 and conducting printing.

Applications running on the host computer 201 generate a page layout document, a word processor document, a graphics document, etc. Digital document data generated by such applications are transmitted to a printer driver, not shown, and a drawing command based on the digital document is generated. It should be noted that the digital document data transmitted to the printer driver is not limited to being generated by the host computer 201, and may be generated by an application of another computer or a scanner and stored in the host computer 201.

A drawing command generated here is typically a page description language, or PDL, for generating page image data. Normally, a drawing command includes not only a drawing instruction for data, such as an image, graphics, and text, but also print settings related to a printing resolution, the number of copies, a page layout, a printing order, and the like as a control instruction. Furthermore, these print settings include a recording agent saving mode for conducting printing with a reduced amount of toner consumption, in addition to a normal mode for conducting normal printing.

A drawing command generated by the printer driver is transmitted to the image processing apparatus 203 via the network. Based on the drawing command received from the host computer 201, the image processing apparatus 203 generates image data in an image format with which the image output apparatus 204 can form an image. The image output apparatus 204 is connected to the image processing apparatus 203 and includes the printer engine 211. The printer engine 211 receives image data that has been generated in a preset image format from the image processing apparatus 203, and conducts printing on a sheet.

The image processing apparatus 203 includes a drawing command processing unit 205, an input image processing unit 206, an output image processing unit 207, and a storage apparatus 208. The drawing command processing unit 205 generates a drawing object by executing analysis processing with respect to the drawing command received from the host computer 201, and generates a bitmap image by further executing rasterizing processing. At this time, a control instruction related to the print settings, such as the recording agent saving mode, included in the drawing command is also extracted. These bitmap image and control instruction are stored into the storage apparatus 208. It should be noted that the storage apparatus 208 is constituted by a part of the RAM 103 or the external storage apparatus 104.

Next, the output image processing unit 207 converts the bitmap image stored in the storage apparatus 208 into an image format processable in the printer engine 211 by executing image processing, such as color conversion processing, density correction processing, and halftone processing, with respect to the bitmap image. It should be noted that processing applied by the output image processing unit 207 changes depending on the statuses of the print settings, e.g., which one of the normal mode and the recording agent saving mode is in effect. The details of processing executed by the output image processing unit 207 will be described later.

Image data thus generated by the image processing apparatus 203 is transmitted to the image output apparatus 204 via the engine interface 107. Using the printer engine 211, the image output apparatus 204 outputs the received image data onto a sheet. That is to say, by going through processing of exposure, development, transfer, and fixing, printing on the sheet serving as transfer material is completed. Through the above-described processing, processing for printing the drawing command from the host computer 201 as an image is completed.

A description is now given of processing for printing a bitmap image input from the image input apparatus 202, such as the scanner 209 and the digital camera 210. The scanner 209 and the digital camera 210 are connected to the image processing apparatus 203 via the external interface 109. The scanner 209 reads a bitmap image by optically scanning an image printed on a sheet of paper or film, measuring the intensities of light reflecting off the sheet and light transmitted through the sheet, and performing analog-to-digital conversion. The digital camera 210 obtains a captured image as a bitmap image by changing the intensities of light into an electrical signal using a CCD composed of an array of photodiodes. The bitmap image obtained here is typically an RGB image.

A bitmap image received from the scanner 209 or the digital camera 210 in the foregoing manner is supplied to the input image processing unit 206. The input image processing unit 206 and the output image processing unit 207 apply image processing to the received bitmap image; consequently, the bitmap image is converted into an image format that the printer engine 211 can receive. Image data thus generated is transferred to the printer engine 211, and the printer engine 211 outputs the image onto a sheet. Through the above-described processing, processing for printing the bitmap image input from the image input apparatus 202, such as the scanner 209, is completed. It goes without saying that bitmap image data and image data that has undergone JPEG compression may be received from the host computer 201, instead of the drawing command. In this case, the image data received from the host computer 201 is input to the input image processing unit 206.

FIG. 3 is a block diagram showing an example of a functional configuration of the output image processing unit 207 shown in FIG. 2. A color conversion unit 301 executes conversion processing for converting RGB color space image data input to the output image processing unit 207 into CMYK color space image data corresponding to toner of four colors, namely, C, M, Y, and K, for image formation by the printer engine 211. A density correction unit 302 executes density correction processing with respect to the CMYK image data resulting from the color conversion processing executed by the color conversion unit 301. For example, the density correction unit 302 performs gamma correction for correcting density characteristics unique to the printer engine 211. Examples of a specific processing method include: a method using a density correction table for associating input density levels with output density levels for each of the colors C, M, Y, and K; and a method in which calculation is performed using a function.

A halftone processing unit 303 executes halftone processing with respect to the CMYK image data resulting from the density correction performed by the density correction unit 302. It is commonly the case that the printer engine 211 supports output with a small number of tones, such as 2, 4, and 16 tones. For this reason, the halftone processing unit 303 executes halftone processing, such as error diffusion processing and dithering processing, so as to enable stable halftone representations in the printer engine 211 that can perform output only with a small number of tones.

The image data resulting from the halftone processing executed by the halftone processing unit 303 is input to a toner consumption amount control unit 304. When the recording agent saving mode is set in the print settings, the toner consumption amount control unit 304 executes thinning processing with respect to the image data resulting from the halftone processing so as to reduce the amount of toner consumption. A more detailed description of the toner consumption amount control unit 304 will now be given with reference to FIG. 4.

FIG. 4 is a block diagram showing a functional configuration of the toner consumption amount control unit 304. In the recording agent saving mode according to the present embodiment, a determination of whether a region is a character region or a photograph region is not made; instead, thinning processing is changed in accordance with a determination of whether a region is a halftone region or a non-halftone region. Furthermore, in the present embodiment, the thinning processing is controlled depending on whether a region that has been determined to be the non-halftone region is an edge portion or a non-edge portion. The toner consumption amount control unit 304 operates so as to apply edge retaining processing to an edge portion of the detected non-halftone region, and so as not to apply the edge retaining processing to the halftone region. In this way, sufficient thinning (toner reduction) is achieved while maintaining the legibility of characters in a character image and avoiding deterioration in the image quality, such as tone reversal.

First, a halftone region determination unit 401 determines whether a pixel in image data forms a non-halftone region. The following describes an example method for such determination. When the density level of the image data resulting from the halftone processing executed by the halftone processing unit 303 is an intermediate level, a certain halftone pattern occurs as a result of the halftone processing. The halftone region determination unit 401 determines whether a target pixel is in a halftone region by detecting the existence of a black pixel forming such a halftone pattern. That is to say, the halftone region determination unit 401 determines whether a target pixel belongs to a non-halftone region based on whether a black pixel exists in a region surrounding the target pixel, the black pixel forming the halftone pattern that appears when the halftone processing has been executed with respect to an intermediate-level region existing in the halftone region.

Figure 5:
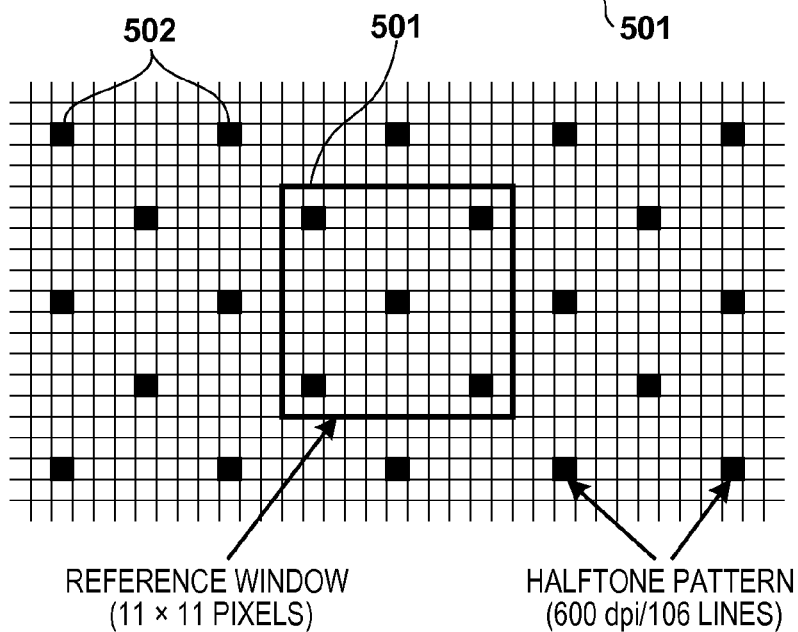
FIG. 5 is a diagram for describing determination processing executed by a halftone region determination unit.

FIG. 5 is a diagram for describing an example processing in which the halftone region determination unit 401 detects the existence of a halftone pattern (hereinafter referred to as pattern matching). The halftone region determination unit 401 determines whether a target pixel belongs to a halftone region using a reference window 501 shown in, for example, FIG. 5. The reference window 501 used in the present example is composed of 11×11 pixels. This window size enables a determination of a halftone region at a printing resolution of 600 dpi after the halftone processing in which a lower limit of the number of lines is 106 lines.

In FIG. 5, pixels 502 denote black pixels forming a halftone pattern in a case where 106-line dithering has been applied at a printing resolution of 600 dpi. An example is shown in which the reference window 501 having a window size of 11×11 pixels has been applied to this region. It is apparent from FIG. 5 that, with the window size of 11×11 pixels, a determination of a halftone region can be made with respect to a region that has undergone halftone processing with at least 106 lines, even in a highlight portion with a small number of lit dots. In this way, in the present embodiment, a target pixel is surrounded by regions whose size (5×5) allows the appearance of at least one black pixel forming a halftone pattern in a highlight portion corresponding to the brightest halftone (the brightest tone next to white). When a black pixel does not exist in the surrounding regions, it is determined that the target pixel belongs to a non-halftone region. Furthermore, in the present embodiment, the reference window 501 is applied in which four 5×5 regions are arranged so as to be centered at the target pixel, and so as not to include vertical and horizontal pixel arrays including the target pixel. When a black pixel does not exist in at least one of these four regions, it is determined that the target pixel belongs to a non-halftone region.

It should be noted that the size of the four regions composing the reference window 501 needs to be change in accordance with the number of lines adopted in the halftone processing (e.g., a dithering matrix). Therefore, it is preferable that the size of the reference window 501, which is referred to in determining whether the target pixel belongs to a halftone region, be changeable in accordance with a printing resolution (dpi) and the number of lines (lpi) adopted in the halftone processing. For example, when conducting printing at a higher printing resolution, or when making a determination of a halftone region to which halftone processing with a smaller number of lines has been applied, it is necessary to enlarge each individual region, and a reference window of a larger size is required. It should be noted that, in a case where a larger number of lines have been adopted, the above-described reference matrix can be used when, for instance, the number of lines adopted is larger than 106 in the foregoing example. This is because, when a large number of lines are adopted, the interval between black pixels appearing in a halftone pattern in a highlight portion decreases.

Therefore, it is also possible to say that determination of whether a black pixel belongs to a halftone region or non-halftone region based on the reference window is determination of whether a black pixel belongs to a region with at least a predetermined number of lines or a region with number of lines smaller than the predetermined number.

In the pattern matching according to the present embodiment using the reference window 501, a determination of a halftone region is made as follows. Assuming the target pixel as No. 0, the target pixel belongs to a non-halftone region if all pixels in region No. 1 are white pixels, the target pixel belongs to a non-halftone region if all pixels in region No. 2 are white pixels, the target pixel belongs to a non-halftone region if all pixels in region No. 3 are white pixels, the target pixel belongs to a non-halftone region if all pixels in region No. 4 are white pixels, and the target pixel belongs to a halftone region in any other cases.

It should be noted that the inventors of the present invention have confirmed that, in an actual halftone region, an edge portion of a black region is determined to be a non-halftone region and a point within the black region is determined to be a halftone region in the above-described determination. However, an objective of the present embodiment is non-application of the edge retaining processing to an edge portion of a non-halftone region, and the above-described method yields a sufficient precision in relation to a determination of a halftone region or a non-halftone region.

Figure 6:
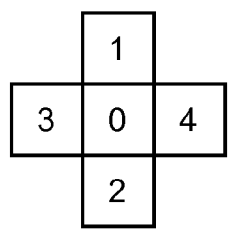
FIG. 6 is a diagram for describing edge detection processing executed by an edge detection unit.

Next, an edge detection unit 402 executes edge portion detection processing with respect to a pixel that has been determined to belong to a non-halftone region by the halftone region determination unit 401. FIG. 6 shows an edge detection window that is used in edge detection processing executed by the edge detection unit 402. The edge detection unit 402 executes the edge detection processing using the edge detection window as follows. Assuming the target pixel as No. 0, the target pixel is an edge portion if No. 0 is a black pixel and No. 1 is a white pixel, the target pixel is an edge portion if No. 0 is a black pixel and No. 2 is a white pixel, the target pixel is an edge portion if No. 0 is a black pixel and No. 3 is a white pixel, the target pixel is an edge portion if No. 0 is a black pixel and No. 4 is a white pixel, and the target pixel is a non-edge portion in any other cases.

A thinning unit 403 executes thinning processing with respect to image data that has undergone halftone processing, on the basis of the result of the determination made by the halftone region determination unit 401 and the result of the detection performed by the edge detection unit 402. The thinning unit 403 executes the thinning processing also in accordance with a thinning pattern obtained by a thinning pattern obtaining unit 404. The thinning pattern obtaining unit 404 selects and obtains a thinning pattern to be used in accordance with, for example, the setting of the recording agent saving mode included in the print settings. The print settings are configured by the user through the printer driver and the operation unit 106. The thinning pattern may be switched in accordance with a type of the halftone processing applied by the halftone processing unit 303.

Table 1 shows a relationship among the results of the determination made by the halftone region determination unit 401, the results of the detection performed by the edge detection unit 402, and the substances of processing executed by the thinning unit 403.

TABLE 1

| Halftone Determination | Edge Detection | Substance of Processing |
|---|---|---|
| Halftone Region | Edge Portion | Targeted for Thinning |
| Halftone Region | Non-Edge Portion | Targeted for Thinning |
| Non-Halftone Region | Edge Portion | Not Targeted for Thinning |
| Non-Halftone Region | Non-Edge Portion | Targeted for Thinning |

That is to say, all of pixels in a halftone region and a pixel of a non-edge portion of a non-halftone region are targeted for thinning; on the other hand, a pixel of an edge portion of a non-halftone region is not targeted for thinning, and this edge portion is retained. In other words, the thinning processing is applied as follows. That is, with regard to a pixel determined to be included in the region with at least the predetermined number of lines, a pixel value is reduced at the same reduction rate whether the pixel is an edge portion or a non-edge portion, and with regard to a pixel determined to be included in a region in which the number of lines is smaller than the predetermined number, a pixel value is reduced in such a manner that a reduction rate is higher when the pixel is the non-edge portion than when the pixel is the edge portion.

Figure 7:
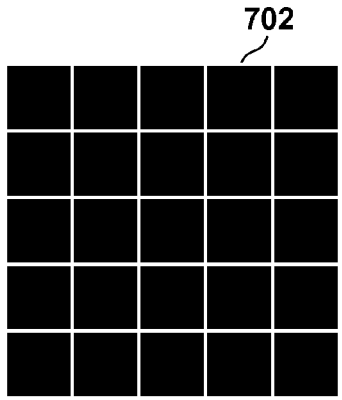
FIG. 7 is a diagram for describing thinning processing executed by a thinning unit.
Figure 7:
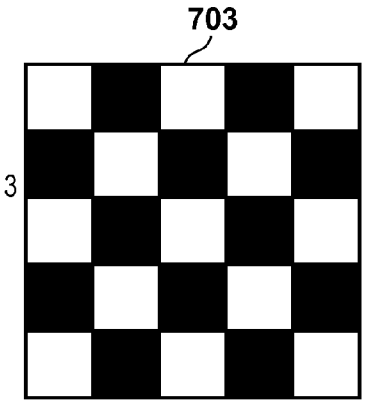
Figure 7:
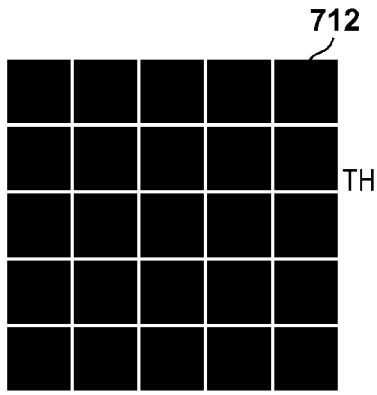
Figure 7:
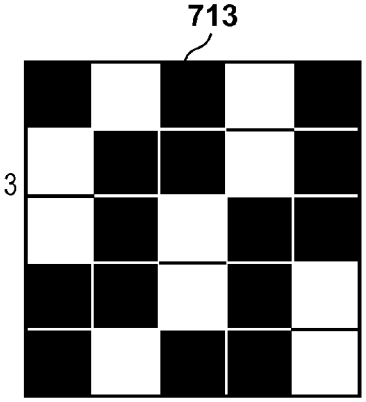

FIG. 7 is a diagram for describing thinning processing executed by the thinning unit 403. For example, a pattern 703 is obtained as a result of executing the thinning processing with respect to No. 0 and No. 3 of a thinning pattern 701 used in a black region 702. In another example, a pattern 713 is obtained as a result of executing the thinning processing with respect to No. 1 and No. 3 of a thinning pattern 711 used in a black region 712. That is to say, the thinning unit 403 thins out pixels corresponding to positions in the thinning pattern obtained by the thinning pattern obtaining unit 404. At this time, the thinning processing is executed with respect to pixels that have been determined to be the targets of thinning in accordance with Table 1 on the basis of the result of the determination made by the halftone region determination unit 401 and the result of the detection performed by the edge detection unit 402, but the thinning processing is restrained from being executed with respect to pixels that have not been determined to be the targets of thinning.

Figure 8:
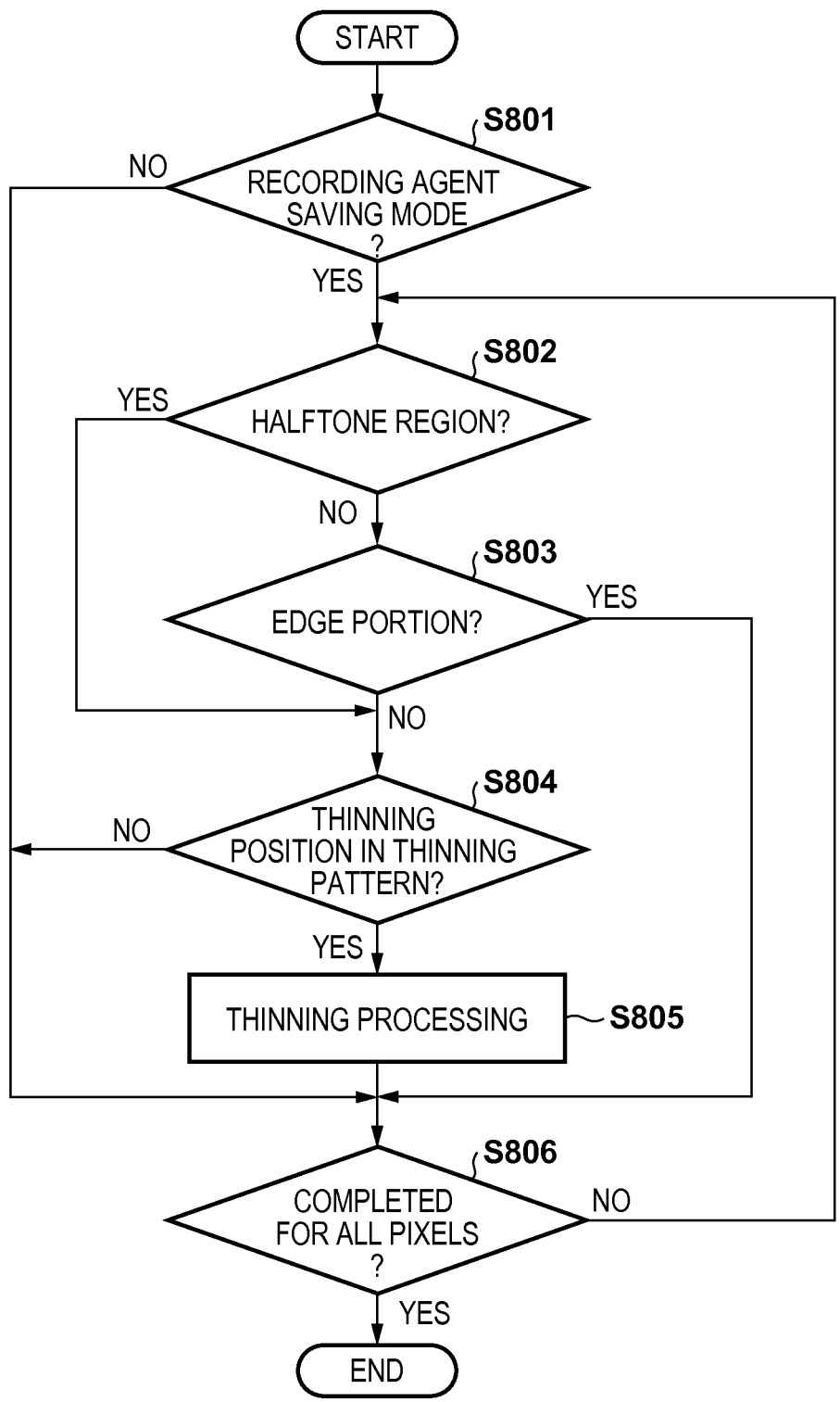
FIG. 8 is a flowchart showing an example of processing executed by the toner consumption amount control unit.

FIG. 8 is a flowchart showing an example of processing executed by the toner consumption amount control unit 304. The processing indicated by the present flowchart is realized by the CPU 101 executing a predetermined program stored in the ROM 102. Meanwhile, a program for realizing the processing order indicated by the flowchart of FIG. 8 is stored in one of the ROM 102, the RAM 103, and the external storage apparatus 104, and executed by the CPU 101.

First, in step S801, the toner consumption amount control unit 304 determines whether the recording agent saving mode is set. If the recording agent saving mode is not set, processing is ended without executing the thinning processing from step S802. On the other hand, if the recording agent saving mode is set, processing proceeds from step S801 to step S802. In step S802, the halftone region determination unit 401 determines whether a target pixel belongs to a halftone region using the reference window 501, for each of pixels in image data. If it is determined that the target pixel belongs to a non-halftone region, processing proceeds to step S803, and the edge detection unit 402 makes an edge determination with respect to the target pixel, and determines whether the target pixel is an edge portion. If the target pixel is determined to be the edge portion in step S803, processing proceeds to step S806 and then returns to step S802 so as to process the next pixel. As a result, thinning is prohibited with respect to a pixel of an edge portion of a non-halftone region.

On the other hand, if it is determined in step S802 that the target pixel belongs to the halftone region, or if it is determined in step S803 that the target pixel belongs to the non-halftone region and is a non-edge portion, processing proceeds to step S804. In step S804, with the use of the thinning pattern obtained by the thinning pattern obtaining unit 404, the thinning unit 403 determines whether the target pixel is in a position targeted for thinning in the obtained thinning pattern. If the target pixel is in the position targeted for thinning, the target pixel is thinned out (step S805). On the other hand, if the target pixel is not in the position targeted for thinning, processing proceeds to step S806. In step S806, whether the foregoing processing has been executed with respect to all of the pixels in the image data is determined, and if there is any unprocessed pixel, processing returns to step S802. If the foregoing processing has been executed with respect to all of the pixels, the present processing is ended.

When the thinning unit 403 has completed the thinning processing for the image data, the image data is output to the printer engine 211 of the image output apparatus 204 and formed as an image on a recording medium, such as a sheet of paper.

As described above, in the first embodiment, during the recording agent saving mode, thinning processing applied to image data that has undergone halftone processing with at least a predetermined number of lines is switched as follows depending on a determination of a halftone region or a non-halftone region.

When a pixel belongs to a halftone region, uniform thinning processing is applied whether the pixel is an edge portion or a non-edge portion.

When a pixel belongs to a non-halftone region, thinning processing is applied to an edge portion but restrained from being applied to a non-edge portion.

Through this processing, thinning processing is restrained from being applied to a pixel that has been determined to be an edge portion of a non-halftone region, and therefore processing for reducing the amount of toner consumption is applied to a non-halftone region so as to retain an edge portion; on the other hand, the processing for reducing the amount of toner consumption is applied uniformly to a halftone region. As an edge portion of a non-halftone region is maintained and the edge retaining processing is not applied to an edge portion of a halftone region, the amount of consumption of the recording agent can be advantageously reduced while suppressing a decrease in the image quality. Furthermore, in the present embodiment, the thinning processing is controlled in accordance with a determination of a halftone region or a non-halftone region using a reference window corresponding to a printing resolution and the number of lines; in this way, processing for identification of a character region or a photograph region is not necessary. Therefore, a decrease in the image quality (a decrease in the legibility of characters) can be suppressed at low cost.

It should be noted that the processes of steps S802 to S805 may be executed only with respect to black pixels. In this case, it is sufficient to determine whether a target pixel is a white pixel or black pixel before step S802, proceed to step S802 if the target pixel is a black pixel, and proceed to step S806 if the target pixel is a white pixel so as to process the next pixel immediately.

In the flowchart of FIG. 8, if it is determined in step S802 that the target pixel belongs to a non-halftone region, processing proceeds to step S803 so as to make the edge determination. However, the edge determination may be made before the halftone region determination of step S802, or the edge determination of step S803 may be performed in parallel with the halftone region determination of step S802.

In the foregoing embodiment, a configuration for restraining a pixel of an edge portion of a non-halftone region from being thinned out is realized by the control for prohibiting the pixel from being thinned out; however, no limitation is intended in this regard. For example, a thinning pattern that has a lower thinning rate (lower pixel reduction rate) than a thinning pattern applied to other portions may be applied to an edge portion of a non-halftone region. In this case, if the target pixel is determined to be the edge portion in step S803, it is sufficient to execute the thinning processing by applying a thinning pattern that has a lower thinning rate than the thinning pattern used in step S805.

In the foregoing embodiment, the thinning processing is changed in accordance with the identification of an edge portion of a non-halftone region; however, the thinning processing may vary with each of a halftone region and a non-halftone region. In this case, thinning processing that has a lower thinning rate than thinning processing applied to a halftone region may be applied to a non-halftone region. However, as the entirety of a non-halftone region is thinned out at a thinning rate that does not impair the legibility of characters, the advantage of reduction in the recording agent is small compared to the processing of FIG. 8 in which an edge portion is restrained from being thinned out.

In the description of the foregoing embodiment, the thinning unit 403 of FIG. 4 executes the thinning processing for turning a black pixel into a white pixel; however, in a case where the halftone processing unit 303 outputs multi-value data, the thinning unit 403 may execute processing for reducing a pixel value. For example, in a case where the halftone processing unit 303 outputs 4-bit data and the 4-bit data is input to the toner consumption amount control unit 304, processing for reducing a 4-bit pixel value to 50% may be executed.

Second Embodiment

In the description of the first embodiment, the reference window 501 used as an example in the halftone region determination, which is made during the recording agent saving mode, is based on a printing resolution of 600 dpi, with a lower limit of the number of lines in the applied halftone processing being 106 lines. As mentioned in the first embodiment, a reference window needs to be changed in accordance with a printing resolution when halftone processing realizes the same number of lines. The following description of a second embodiment relates to a configuration supporting a plurality of printing resolutions. It should be noted that a hardware configuration and a functional configuration of an image forming apparatus 200 according to the second embodiment are similar to those according to the first embodiment.

Figure 9:
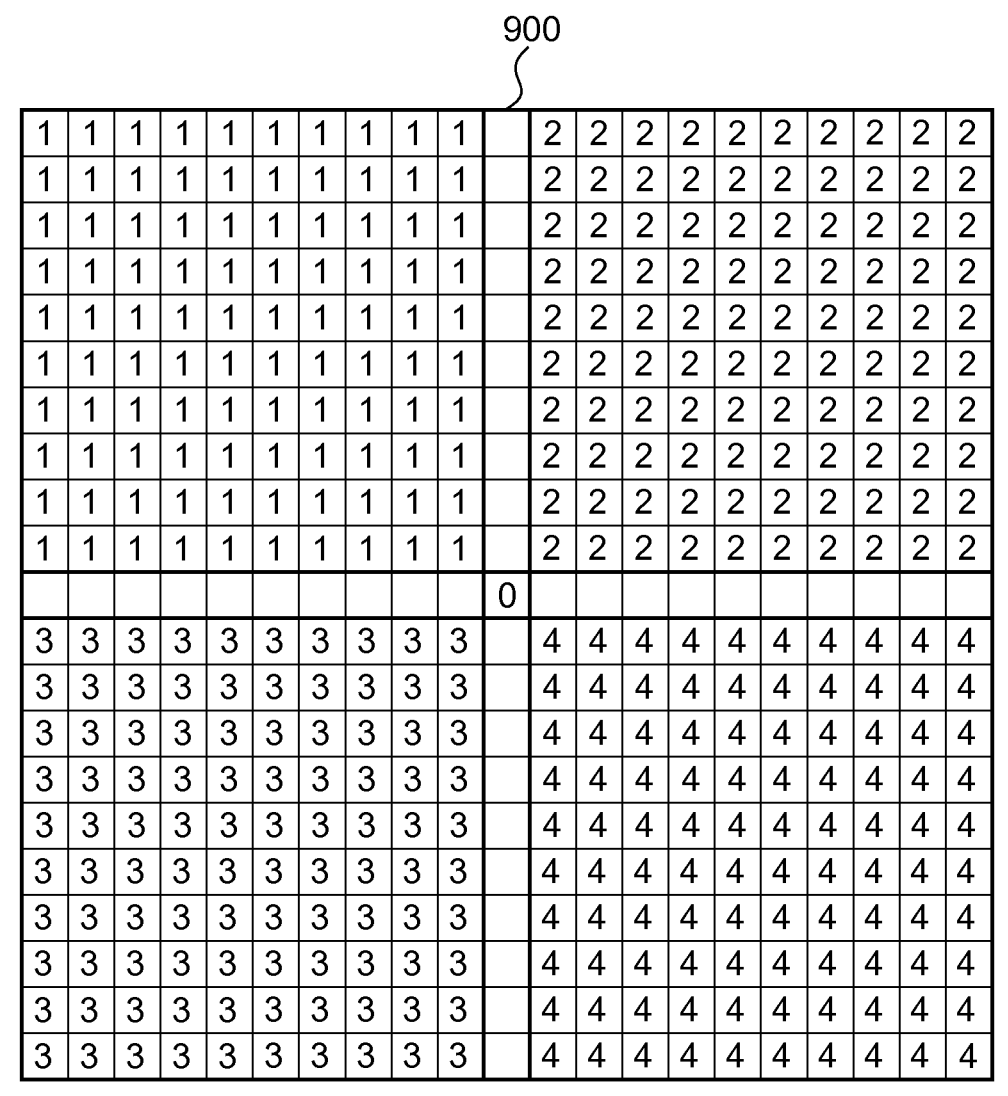

In order for the halftone region determination unit 401 to determine whether a target pixel belongs to a halftone region or a non-halftone region, it is necessary to change a window size to be referred to in accordance with a printing resolution and the number of lines realized by the applied halftone processing. FIG. 9 shows a reference window 900 used by the halftone region determination unit according to the second embodiment. The reference window 900 shown in FIG. 9 is composed of 22×22 pixels. This window size enables a determination of a halftone region at a printing resolution of 1200 dpi, with a lower limit of the number of lines in the halftone processing being 106 lines.

The halftone region determination unit 401 according to the second embodiment switches the size of the reference window in accordance with the printing resolution when the number of lines in the halftone processing is equal to or larger than 106 lines. More specifically, in order to determine whether a target pixel belongs to a halftone region, the halftone region determination unit 401 uses the reference window 501 at a printing resolution of 600 dpi, and uses the reference window 900 at a printing resolution of 1200 dpi. With this configuration, even if the printing resolution has been switched according to the print settings, a halftone region processed by the halftone processing unit can be determined. The supported printing resolutions are not limited to the resolutions indicated above, and the number of resolutions to switch between is not limited to two. Switching of the printing resolution may be transmitted by the printer driver as the print settings, or may be set by the user via the operation unit 106. It is also possible to switch the reference window in accordance with combinations of the printing resolutions and the numbers of lines.

In pattern matching using the reference window 900 according to the present embodiment shown in FIG. 9, a determination of a halftone region is made as follows. Assuming the target pixel as No. 0,
the target pixel belongs to a non-halftone region if all pixels in region No. 1 are white pixels, the target pixel belongs to a non-halftone region if all pixels in region No. 2 are white pixels, the target pixel belongs to a non-halftone region if all pixels in region No. 3 are white pixels, the target pixel belongs to a non-halftone region if all pixels in region No. 4 are white pixels, and the target pixel belongs to a halftone region in any other cases.

As indicated above, in the second embodiment of the present invention, during the recording agent saving mode, whether a target pixel belongs to a halftone region or a non-halftone region is determined with respect to an image that has undergone halftone processing with at least a predetermined number of lines. At this time, the reference window used in the determination is switched in accordance with a printing resolution. If the target pixel belongs to a non-halftone region, processing for reducing the amount of toner consumption is applied while retaining an edge portion, whereas if the target pixel belongs to halftone region, the processing for reducing the amount of toner consumption is applied uniformly. This makes it possible to provide an image processing apparatus that can advantageously reduce the amount of consumption of a recording agent at low cost while suppressing a decrease in the image quality, similarly to the first embodiment.

As described above, both of the foregoing embodiments control thinning processing in accordance with a determination of a halftone region or a non-halftone region, thereby enabling a reduction in the amount of consumption of the recording agent at low cost while suppressing a decrease in the image quality.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-105661, filed May 21, 2014 which is hereby incorporated by reference herein in its entirety.

What is claimed is:

1. An image processing apparatus, comprising:
a memory configured to store instructions; and
one or more processors configured to execute the instructions stored in the memory and cause the image processing apparatus to function as:
 a determination unit configured to determine whether a pixel in an image is included in a region with at least a predetermined number of lines; and
 a reduction unit configured to, with regard to a pixel that is determined by the determination unit to be included in the region with at least the predetermined number of lines, reduce a pixel value at the same reduction rate whether the pixel is an edge portion or a non-edge portion, and with regard to a pixel that is determined by the determination unit to be included in a region in which the number of lines is smaller than the predetermined number, reduce a pixel value in such a manner that a reduction rate is higher when the pixel is the non-edge portion than when the pixel is the edge portion.

2. The apparatus according to claim 1, wherein
the determination unit determines whether a black pixel exists in a region surrounding a target pixel in the image, and determines that the target pixel is included in the region with at least the predetermined number of lines when the black pixel exists, and that the target pixel is not included in the region with at least the predetermined number of lines when the black pixel does not exist.

3. The apparatus according to claim 2, wherein
a size of the region surrounding the target pixel is decided on based on the predetermined number of lines.

4. The apparatus according to claim 1, wherein
halftone processing has been applied to the image.

5. The apparatus according to claim 1, wherein
with regard to the pixel that is included in the region in which the number of lines is smaller than the predetermined number, the reduction unit does not reduce the pixel value when the pixel is the edge portion.

6. The apparatus according to claim 1, wherein
the determination unit makes the determination only when the pixel in the image is not a white pixel.

7. An image processing apparatus, comprising:
a memory configured to store instructions; and
one or more processors configured to execute the instructions stored in the memory and cause the image processing apparatus to function as:
 a determination unit configured to determine whether a pixel in a binary image is included in a region with at least a predetermined number of lines, the binary image including white and black pixels; and
 a correction unit configured
  to correct a part of black pixels that have been determined by the determination unit to be included in the region with at least the predetermined number of lines to white pixels,
  to correct a part of black pixels that have been determined by the determination unit to be included in a region in which the number of lines is smaller than the predetermined number and that are non-edge portions to white pixels, and not to correct black pixels that have been determined by the determination unit to be included in the region in which the number of lines is smaller than the predetermined number and that are edge portions to white pixels.

8. An image processing method, comprising:
a determination step of determining whether a pixel in an image is included in a region with at least a predetermined number of lines; and
a reduction step of, with regard to a pixel that is determined in the determination step to be included in the region with at least the predetermined number of lines, reducing a pixel value at the same reduction rate whether the pixel is an edge portion or a non-edge portion, and with regard to a pixel that is determined in the determination step to be included in a region in which the number of lines is smaller than the predetermined number, reducing a pixel value in such a manner that a reduction rate is higher when the pixel is the non-edge portion than when the pixel is the edge portion.

9. An image processing method, comprising:
a determination step of determining whether a pixel in a binary image is included in a region with at least a predetermined number of lines, the binary image including white and black pixels; and
a correction step of
correcting a part of black pixels that have been determined in the determination step to be included in the region with the predetermined number of lines to white pixels,
correcting a part of black pixels that have been determined in the determination step to be included in a region in which the number of lines is smaller than the predetermined number and that are non-edge portions to white pixels, and
not correcting black pixels that have been determined in the determination step to be included in the region in which the number of lines is smaller than the predetermined number and that are edge portions to white pixels.

10. A non-transitory computer readable medium storing a program for causing a computer to execute the steps of a control method comprising:
a determination step of determining whether a pixel in an image is included in a region with at least a predetermined number of lines; and
a reduction step of, with regard to a pixel that is determined in the determination step to be included in the region with at least the predetermined number of lines, reducing a pixel value at the same reduction rate whether the pixel is an edge portion or a non-edge portion, and with regard to a pixel that is determined in the determination step to be included in a region in which the number of lines is smaller than the predetermined number, reducing a pixel value in such a manner that a reduction rate is higher when the pixel is the non-edge portion than when the pixel is the edge portion.

11. A non-transitory computer readable storage medium storing a program for causing a computer to execute the steps of a control method comprising:
a determination step of determining whether a pixel in a binary image is included in a region with at least a predetermined number of lines, the binary image including white and black pixels; and
a correction step of
correcting a part of black pixels that have been determined in the determination step to be included in the region with at least the predetermined number of lines to white pixels,
correcting a part of black pixels that have been determined in the determination step to be included in a region in which the number of lines is smaller than the predetermined number and that are non-edge portions to white pixels, and
not correcting black pixels that have been determined in the determination step to be included in the region in which the number of lines is smaller than the predetermined number and that are edge portions to white pixels.

12. An image processing apparatus, comprising:
a memory configured to store instructions; and
one or more processors configured to execute the instructions stored in the memory and cause the image processing apparatus to function as:
a determination unit configured to determine whether a pixel in an image is included in a halftone region; and
a reduction unit configured to, with regard to a pixel that is determined by the determination unit to be included in the halftone region, reduce a pixel value at the same reduction rate in an edge portion and a non-edge portion, and with regard to a pixel that is determined by the determination unit not to be included in the halftone region, reduce a pixel value in such a manner that a reduction rate in the non-edge portion is higher than a reduction rate in the edge portion.

13. The apparatus according to claim 12, wherein
the determination unit determines whether a black pixel exists in a region surrounding a target pixel in the image, and determines that the target pixel is included in the half tone region when the black pixel exists, and that the target pixel is not included in the halftone region when the black pixel does not exist.

14. The apparatus according to claim 12, wherein
halftone processing has been applied to the image.

15. The apparatus according to claim 12, wherein
with regard to the pixel that is included in the halftone region, the reduction unit does not reduce the pixel value when the pixel is the edge portion.

16. The apparatus according to claim 12, wherein
the determination unit makes the determination only when the pixel in the image is not a white pixel.

17. An image processing method, comprising:
a determination step of determining whether a pixel in an image is included in a halftone region; and
a reduction step of, with regard to a pixel that is determined by in the determination step to be included in the halftone region, reducing a pixel value at the same reduction rate in an edge portion and a non-edge portion, and with regard to a pixel that is determined by the determination step not to be included in the halftone region, reducing a pixel value in such a manner that a reduction rate in the non-edge portion is higher than a reduction rate in the edge portion.

18. A non-transitory computer readable medium storing a program for causing a computer to execute the steps of a control method comprising:
a determination step of determining whether a pixel in an image is included in a halftone region; and
a reduction step of, with regard to a pixel that is determined by in the determination step to be included in the halftone region, reducing a pixel value at the same reduction rate in an edge portion and a non-edge portion, and with regard to a pixel that is determined by the determination step not to be included in the halftone region, reducing a pixel value in such a manner that a reduction rate in the non-edge portion is higher than a reduction rate in the edge portion.

* * * * *